United States Patent [19]
Epstein et al.

[11] Patent Number: 5,222,073
[45] Date of Patent: Jun. 22, 1993

[54] ROD LASERS

[75] Inventors: Harold M. Epstein; Craig I. Walters, both of Columbus; Jeffrey L. Dulaney, Dublin, all of Ohio

[73] Assignee: Battelle Memorial Institute, Columbus, Ohio

[21] Appl. No.: 751,281

[22] Filed: Aug. 29, 1991

[51] Int. Cl.$^5$ .............................................. H01S 3/04
[52] U.S. Cl. ...................... 372/34; 372/35; 372/69; 372/72; 372/92
[58] Field of Search ............ 372/35, 92, 69, 72, 372/34

[56] References Cited
U.S. PATENT DOCUMENTS

| | | | |
|---|---|---|---|
| 3,621,458 | 11/1971 | Cabezas | 372/70 |
| 3,638,140 | 1/1972 | Knapp | 372/35 |
| 3,891,945 | 6/1975 | Schlossberg et al. | 372/35 |
| 4,150,341 | 4/1979 | Ferguson | 372/35 |
| 4,207,541 | 6/1980 | Karger et al. | 372/35 |
| 4,567,597 | 1/1986 | Mandella | 372/34 |
| 4,644,550 | 1/1987 | Cséry et al. | 372/35 |
| 4,715,039 | 12/1987 | Miller et al. | 372/35 |
| 4,845,721 | 7/1989 | Hoffmann | 372/35 |
| 4,910,746 | 3/1990 | Nicholson | 372/35 |

OTHER PUBLICATIONS

Ananev, Yu. A. et al; Distribution of Pumping Radiation Density in a Laser Crystal; Opt. Spectrosk; vol. 16; 1964; pp. 702–704; Jun. 17, 1963.

Dulaney, J. L. et al; Measurement of Laser Glass Energy Storage Efficiencies; Proceedings of the International Conference on Laser; Dec. 3–8, 1989; pp. 1129–1134.

Primary Examiner—Léon Scott, Jr.
Attorney, Agent, or Firm—Klaus H. Wiesmann; Philip M. Dunson

[57] ABSTRACT

Atoms in a neodymium:glass rod 20 are excited to a substantially spatially uniform metastable state by flashlamps 21. A flowing fluid 26 cools the flashlamps, but not the rod; so that low temperature gradients are maintained in the rod during isothermal laser operation. Automatic control means 22 turn off the electrical power supply 24 when the temperature in the rod reaches a predetermined limit. A flowing fluid 23 then cools the rod, at a rate low enough to avoid thermal stress therein, while it is not lasing. Segments of reflectors 25 focus the pump photons in the rod so as to substantially balance the cylindrical lensing action of the rod against the radial attenuation through it, and thus to provide substantially uniform density of stored energy in the rod.

46 Claims, 4 Drawing Sheets

ROD LASERS

FIELD

This invention relates to high-average-power, low-temperature-gradient lasers employing rods instead of slabs, which are more expensive and are limited in their energy storage capabilities because of parasitic oscillation. Low temperature gradients are achieved by operating isothermally to a temperature limit, then cooling while the beam is off. This results in low divergence and high brightness of the beam.

BACKGROUND

The principal disadvantage of rod-type lasers is that the temperature gradient arising from cooling the cylindrical surface to extract heat deposited throughout the volume leads to thermal lensing, with corresponding spatial aberrations, and to stress birefringence.

DISCLOSURE

In accordance with the present invention, it is possible to nearly eliminate the temperature gradients during lasing for a neodymium:glass rod laser system, and most other rod laser systems, and thus to decrease the beam divergence and increase the brightness.

This is accomplished by operating without cooling until the rod reaches a temperature where the thermal population in the lower laser level begins to significantly lower the inversion density. (Population inversion density is defined as $(N_2 - g_2 N_1/g_1)$ where $N_2$ and $N_1$ are the number of ions in the upper and lower laser levels, respectively. The factors $g_1$ and $g_2$ represent the degeneracy of the levels.) At that time, the laser is turned off and cooled at a rate limited only by the thermal-stress fracture level of the glass, which typically is about 20 W/cm of length for heat absorbed in strengthened phosphate glasses.

DRAWINGS

CARRYING OUT THE INVENTION

Figure 2:
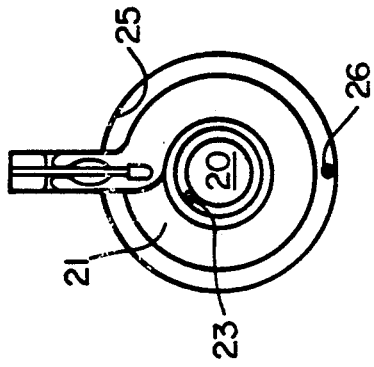
FIG. 2 is a sectional view, taken in the plane 2—2, of the laser stage in FIG. 1.
Figure 1:
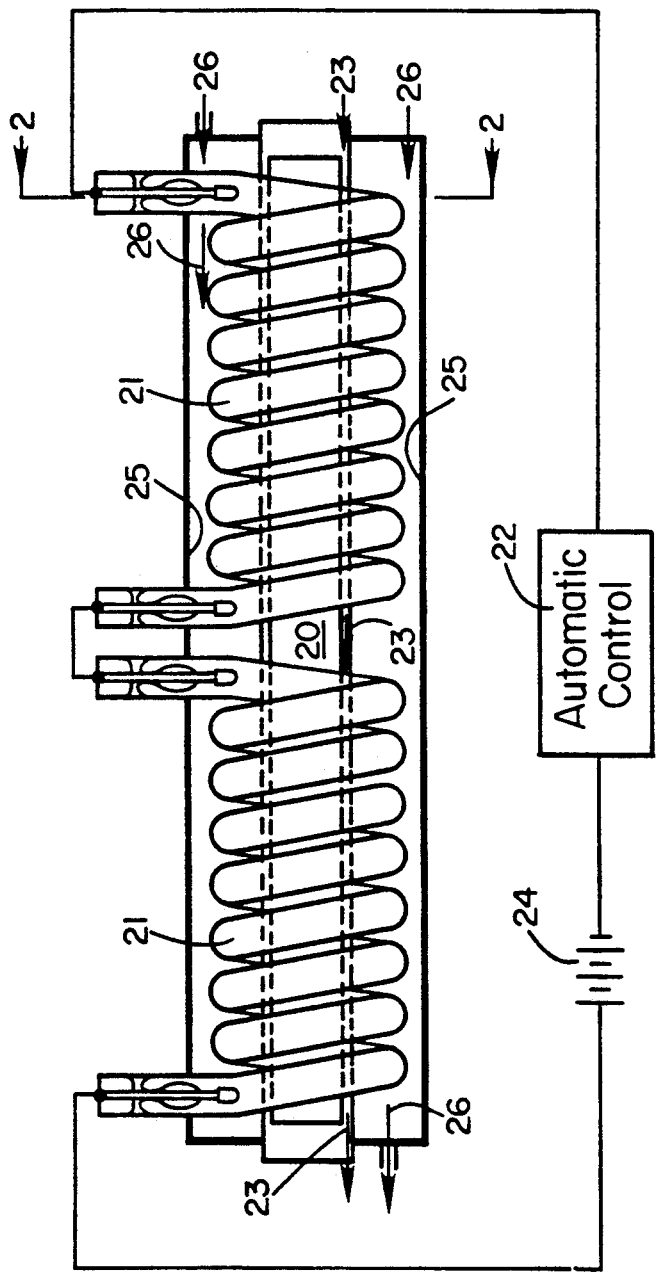
FIG. 1 is a partly schematic side view of a typical laser stage according to the present invention.

Referring now to FIGS. 1 and 2, typical laser apparatus according to the present invention comprises a rod 20 comprising solid lasable material, pumping means 21 for exciting atoms in the rod 20 to a metastable state, means 22 for maintaining low temperature gradients in the rod 20 during periods of laser operation, and means 23 for cooling the rod at other times only.

The means 22 for maintaining low temperature gradients in the rod 20 typically comprises control means responsive either to temperature, for terminating a period of operation by automatically discontinuing the supplying of pump energy to the rod (typically by turning off the electrical power supply 24) when the temperature in the rod reaches a predetermined temperature; or to the output (a function of the gain) of the laser, for terminating a period of operation by automatically discontinuing the supplying of pump energy to the rod when the inversion density declines to a predetermined value (or, equivalently, when the thermal population in the lower laser level increases to a predetermined value); or to time, for terminating a period of operation by automatically discontinuing the supplying of pump energy to the rod when the laser has been in operation for a predetermined length of time.

The rod cooling means 23 cools the rod 20 at a rate low enough to avoid thermal stress fracture therein. It typically comprises fluid (liquid or gas) at a selected temperature substantially surrounding the rod 20 and flowing along the rod 20 at a predetermined rate.

The rod 20 typically comprises strengthened phosphate glass. Preferably, and especially in a laser amplifier stage, the rod 20 comprises glass that was strengthened by an ion exchange process. Suitable glasses include Kigre Q-89 strengthened phosphate glass, Schott APG-1, Hoya HAP-3, and substantial equivalents thereof.

The cooling means 23 should cool the rod 20 at a rate not greater than about 20 watts per centimeter of length of the rod.

Figure 3:
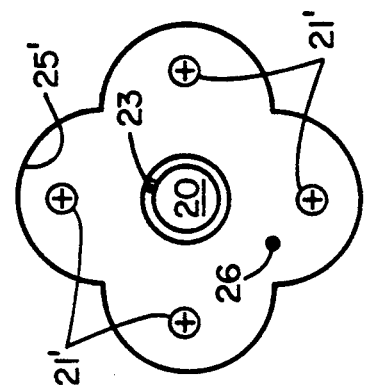
FIG. 3 is a sectional view similar to FIG. 2 of a laser stage as in FIG. 1, except that the helical flashlamps in FIG. 1 are replaced by linear flashlamps and the cross-sectional shape is modified accordingly.
Figure 4:
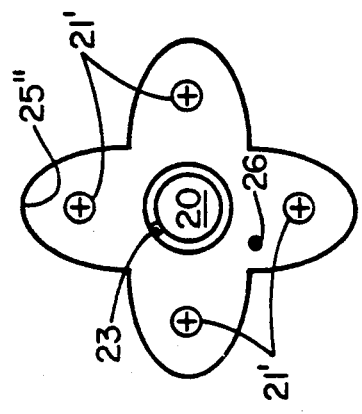
FIG. 4 is a sectional view similar to FIG. 3, but with a slightly different cross-sectional shape.

The apparatus typically comprises means 25, 25', or 25" for substantially balancing the cylindrical lensing action of the rod 20 against the radial attenuation through it, to provide substantially uniform density of stored energy therein. Typical balancing means comprises wall focusing means for focusing the pump photons in the rod 20 to increase the ratio of energy density in the vicinity of the axis of the rod to the energy density in the vicinity of the outer surface of the rod.

Where the atom exciting means comprises helical flashlamps 21 around the rod 20, as in FIGS. 1 and 2, the balancing means typically comprises cylindrical wall focusing (reflecting) means 25 around the flashlamps 21. Where the atom exciting means comprises linear flashlamps 21' parallel to, and evenly spaced around, the rod 20, as in FIGS. 3 and 4, the balancing means comprises ellipsoidal wall focusing (reflecting) means 25' or 25"

parallel to the axis, and partly around, each flashlamp 21'. As shown in FIG. 3, the cross-sectional shape of the reflecting surface 25' of the ellipsoid may comprise a portion of a circle, typically about a half circle or less, whose center lies on the axis of the flashlamp 21'. Or, preferably, as in FIG. 4, the cross-sectional shape of the reflecting surface 25" of the ellipsoid may comprise a portion of an ellipse, typically about half of an ellipse, one focus of which lies on the axis of the flashlamp 21' and the other focus of which lies on the axis of the rod 20.

Where the rod 20 comprises neodymium doped glass, the product of the concentration of the neodymium, C, in percent by weight, multiplied by the radius, R, of the rod in centimeters, typically is about 2 to 4.

The apparatus typically comprises means for controlling the atom exciting means to provide quasi continuous wave operation. Typically the atom exciting means comprises the flashlamps 21, and the controlling means comprises means in the automatic control 22 for controlling the pulse rate and the pulse energy in the flashlamps 21.

Alternatively, the apparatus typically comprises means in the automatic control 22 for controlling the atom exciting means 21 to provide Q-switched operation wherein pulses are extracted in groups at a frequency such that the time between pulses is substantially less than the fluorescent lifetime of material in the rod 20. Where the rod 20 comprises neodymium:glass, the pulses are extracted in groups at a frequency of at least about 10 kilohertz.

The atom exciting means 21 typically comprises pumping means for providing substantially uniform spatial distribution in the excitation, and the pumping means typically comprises helical flashlamp means 21 around the rod 20, the helix having a substantially uniform pitch. Typically the apparatus comprises means for cooling the flashlamp means 21 during laser operation without appreciably affecting temperatures in the rod 20. The flashlamp cooling means 21 typically comprises a flowing fluid 26.

For highest average power, heating time should be short compared to cooling time. But this condition means that there is not enough time for thermal equilibration, and temperature profiles are determined predominantly by the flashlamp pump-energy deposition profile. A uniform spatial profile can be achieved in a simple cylindrical cavity design by balancing the cylindrical lensing associated with the rod against the radial attenuation through the rod. Analytical solutions for the radial energy distribution as a function of absorption coefficient have been developed in Yu A. Ananev and E. A. Korolev, "Distribution of Pumping Radiation Density in a Laser Crystal", Opt. Spectrosk., 16, 702–704 (1964); UDC 621.375.9:535.0.

Figure 6:
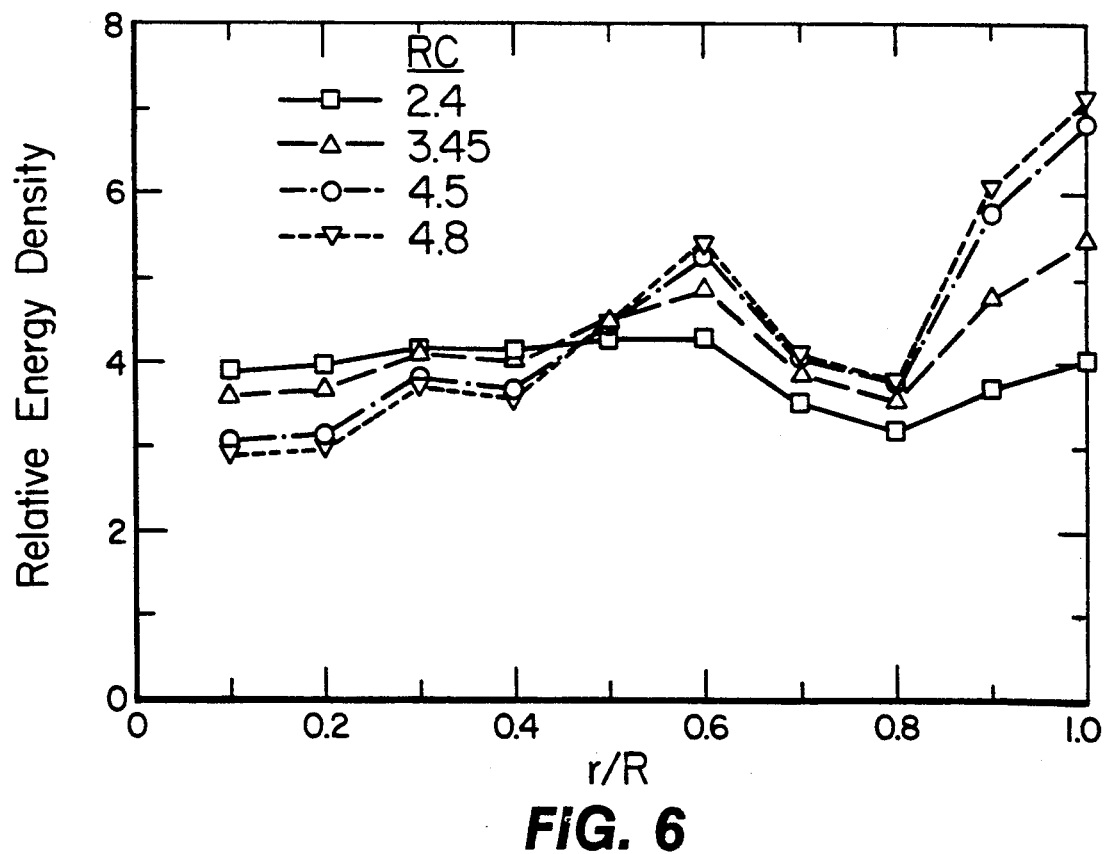
FIG. 6 is a graph of relative energy density versus normalized radial position r/R, showing the spatial energy distribution in master oscillator power amplifier rods, for four values of the product RC.
Figure 7:
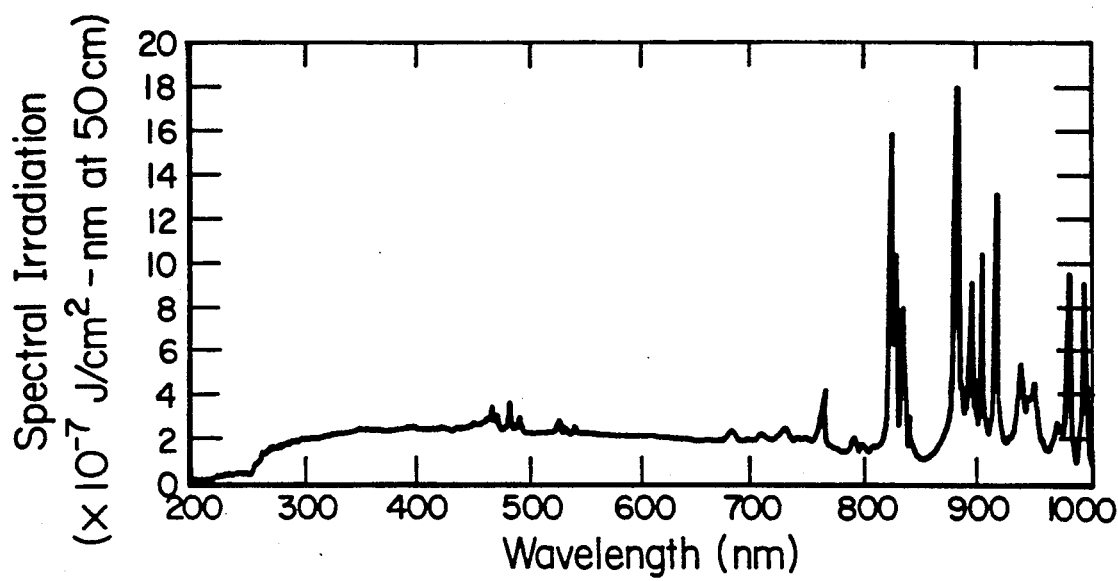
FIG. 7 is a graph of spectral irradiation versus wavelength for flashlamps at low power density in a laser as in FIG. 1.
Figure 8:
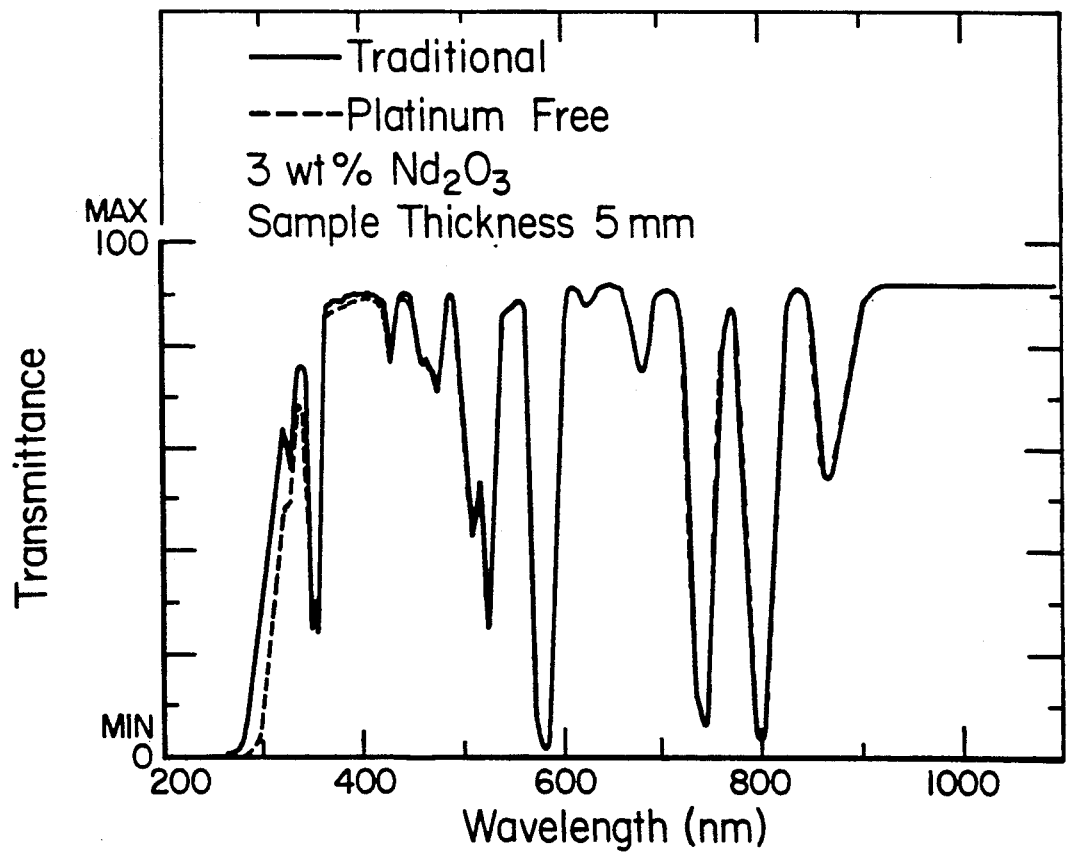
FIG. 8 is a graph of transmittance versus wavelength for two percent phosphate laser glass usable in lasers according to this invention.

As can be seen from FIG. 6, the radial distribution depends on the product CR, where C is the neodymium concentration in weight percent and R is the radius of the rod in centimeters. For $CR=3$, the distribution is flat to within about 10 percent.

Figure 5:
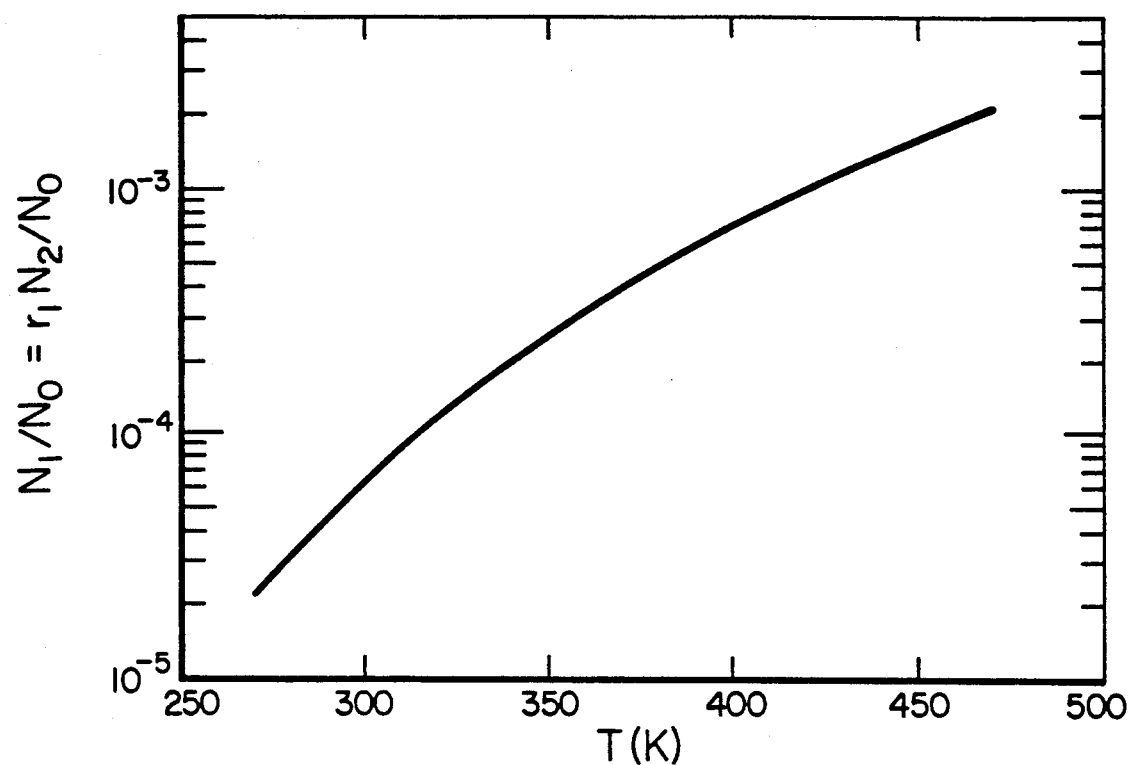
FIG. 5 is a graph of $N_1/N_0$ versus temperature, T, showing the effect of temperature on the population of the lower laser level in a neodymium:glass rod laser according to the present invention.

The glass temperature limitation is a function of $N_0$, $N_1$, and $N_2$; the populations in the ground state, lower laser, and upper laser levels, respectively. The population of $N_1$, which is 0.25 eV above ground state, increases with temperature. The effect of gain medium temperature on $N_1/N_0$, which equals $r_1 N_2/N_0$, ($r_1 = N_1/N_2$) is shown in FIG. 5. The factor, $(1-r_1)$, represents a fractional decrease in the gain coefficient due to thermal population of $N_1$. For a cavity based on cylindrical focusing, $RN_0$ should be about $3 \times 10^{20} cm^{-2}$. An increase in R requires a decrease $N_0$, which allows an increase in the $\Delta T$ to produce a given decrease in gain. The reduction in gain due to heating is inversely proportional to R, for a given gain at a fixed temperature. The present invention is therefore especially advantageous with large rods.

For a 3-cm diameter rod with $N_2$ pumped to $10^{18} cm^{-3}$, a temperature rise from 290 to 450 K reduces the gain by only about 10 percent. Assuming a typical specific heat of 2.2 $Jcm^{-3}K^{-1}$, the rod can absorb 352 $Jcm^{-3}$. The ratio of thermal energy to available stored energy for a good laser glass under favorable flashlamp pump conditions is about 1.55, as is brought out in J. L. Dulaney and H. M. Epstein, "Measurement of Laser Glass Energy Storage Efficiencies", Proceedings Int. Conf. Las. '89, New Orleans, LA (1989), D. G. Harris and T. M. Shay, Eds., STS Press, McLean, Va., pp. 1129–1134.

Thus about 227 $Jcm^{-3}$ of output energy is available before the cooling part of the cycle is initiated. Typical extraction efficiencies are about 50 to 60 percent for quasi continuous wave operation. Quasi continuous wave operation is pulsed operation where the time between pulses is a small fraction (typically less than one-third) of the fluorescent lifetime, (typically about 300 µs for neodymium:glass). For a large volume rod cavity such as the CGE-VD-640 (64 mm diameter by 650 mm long; manufactured by Compagnie Generale Electrique (CGE), of France), up to about 250,000 J can be extracted before cooling.

With Q-switched systems, the efficiency is considerably lower, unless pulses are extracted in groups at frequencies of at least about 10 kHz. This batched pulse mode operation is particularly attractive for laser-plasma X-ray generation for lithography because the wafer-mask unit can be exchanged between batches of pulses.

Having a uniform spatial pump distribution is important. The primary reason is that temperature gradients degrade the quality of the laser beam. Also nonuniformity in the pump distribution produces nonuniformity in the profile of the beam. In continuous wave operation, where the extraction efficiency is high, the beam profile corresponds closely to the pump distribution; but in the high repetition rate Q-switched operation, pump nonuniformity can be greatly amplified in the beam profile. In extreme cases, weakly pumped areas will not lase. Since the maximum energy output is limited by potential coating damage, any lack of beam uniformity is reflected as a decrease in energy output. Stress birefringence can also create beam nonuniformity roughly in the shape of a Maltese cross.

Figure 9:
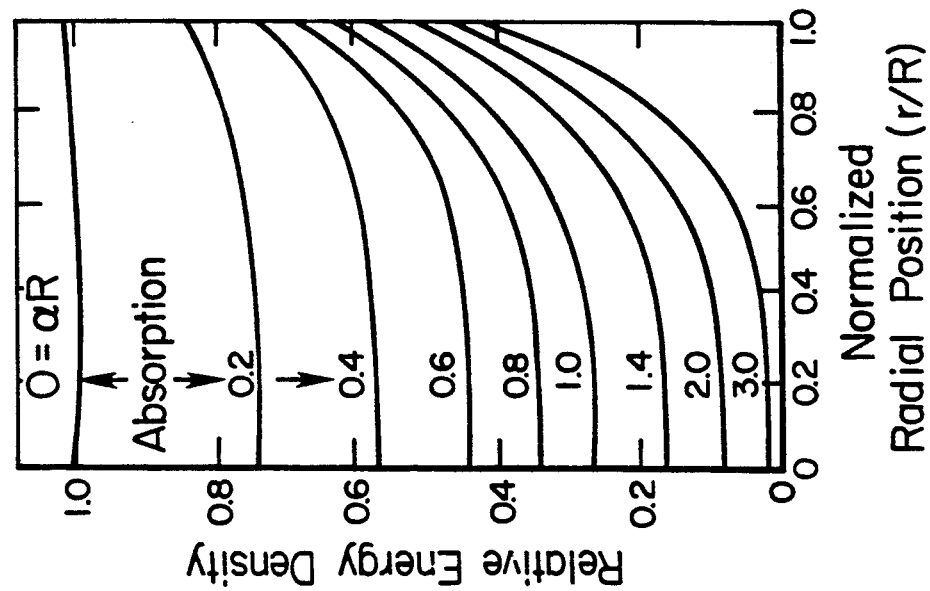
FIG. 9 is a graph of relative energy density versus normalized radial position r/R, for several values of absorption, in a neodymium:glass laser rod without wall focusing.

A pump cavity with no mechanism for focusing the pump photons produces the maximum pump concentration on the outer perimeter of the rod and the minimum at the center, as shown in FIG. 9, which comprises curves of relative energy density within a neodymium:glass rod having a frosted lateral surface and situated in an isotropic field, as functions of normalized radius for different absorption values. The ratio of peak to average energy density depends only on the concentration of the neodymium in the rod.

Figure 10:
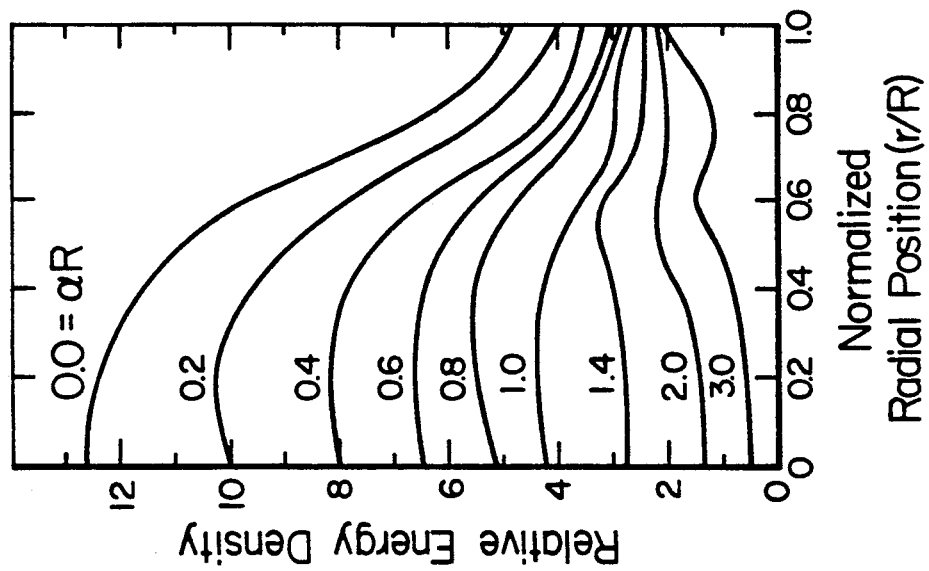
FIG. 10 is a graph similar to FIG. 9 for a similar laser rod with cylindrical wall focusing for fixed absorption values, usable in lasers according to the present invention.

The spatial energy distribution of a rod-type laser depends on cylindrical focusing of the essentially isotropic pump light in the cavity. Without the cylindrical focusing arising from the rod and cooling channel, the energy would be strongly peaked at the outer surface. The radial energy distribution for a neodymium:glass rod (in a cavity with cylindrical wall focusing) as a function of $\alpha R$ is shown in FIG. 10, where $\alpha(\lambda)$ is the absorption cross section, R is the radius of the rod, r is the radial position in the rod, and $E(r/R)$ is the spatial energy density. For each $\alpha R$, the integral $$N = {}_0\int^1 (r/R)E(r/R)d(r/R) \tag{1}$$

was evaluated to determine the normalizing constant, N.

Taking the intensity - wavelength product $I(\lambda)\lambda = I'$, compensates for the quantum deficit associated with photon absorption in states above the upper laser level. $I'$ is also weighted by the absorption in a Gaussian mean chord length $(4V/S)$ at each $\alpha R$, where V and S are the volume and surface area of the rod. This weighting factor is $(1-e^{-2\alpha R})$. The radial distribution of energy density, $E(r/R)$, is given by $$E(r/R) = {}_0\int^{(\alpha R)max} I'(\alpha R)E(r/R,\alpha R)(1-e^{-2\alpha R})d(\alpha R) \tag{2}$$

Figure 11:
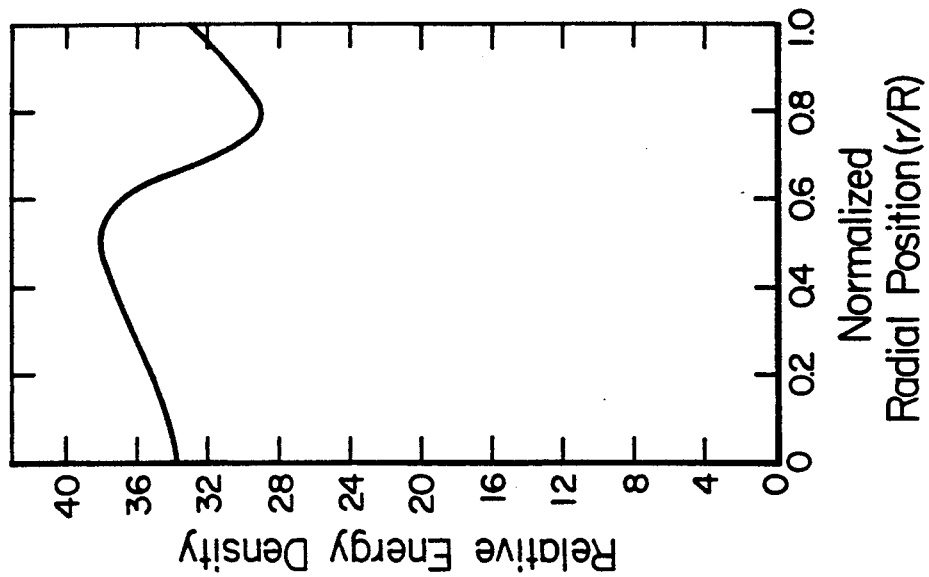
FIG. 11 is a graph of relative energy density versus normalized radial position r/R for a laser rod as in FIG. 10. Absorption values were determined by integration over all wavelengths of pump light.

For the 3.2 cm radius rods in the Battelle CGE amplifiers, with 1 percent neodymium doping, the radial energy distribution including cylindrical focusing is shown in FIG. 11.

The calculation of the radial energy density distribution is done in the Turbo Basic computer program called RADEN.BAS. This program, developed at Battelle Memorial Institute, is explained in Battelle's Final Report, Phase I, High Average Power Burst Neodymium Laser; Contract DAAH01-88-C-0481; to U.S. Army Missile Command, Redstone Arsenal, Alabama 35898-5245, September, 1990; in Appendix A, Computer Code Listings. The integral describing $E(r/R)$ above was solved for given values of the normalized radial position, $r/R$. The integral was approximated by a Riemann sum, $$E(r/R) \sim \sum_0^{(\alpha R)_{max}} [I'(\alpha R)E(r/R,\alpha R)(1 - \exp(-2\alpha R))d(\alpha R)] \tag{3}$$

There were no external inputs in this code. However, values of R and doping can be changed within the code.

FIG. 6 shows the effect of neodymium concentration, C, on spatial uniformity for rods in a master oscillator power amplifier (MOPA) chain. The rod radii used in these calculations correspond to the rods in Battelle's CGE neodymium:glass system. The smaller radius (0.8 cm) rods with a CR of 2.4 have a higher intensity in the center, while the 1.15, 1.6, and 2.25 cm radius rods, with CRs of 3.45, 4.8, and 4.5, respectively, peak on the outside.

The largest MOPA rod is 3.2 cm with a CR of 3.2. Before choosing the 1 weight percent neodymium doping for the large rods experimental studies were carried out with 0.7 weight percent, 1 weight percent, and 2 weight percent doping. These experiments confirmed the calculated CR scaling and showed that a CR between about 1.9 and 4.1, corresponding to concentrations between about 0.6 and 1.3 weight percent, produce acceptable spatial distributions.

The principal temperature limitation is associated with the thermal population of the lower laser level which is only 0.25 eV above the ground state. The population in the lower laser level, $N_1$, is given approximately by $$N_1/N_0 \approx \exp(-2900/T) \tag{4}$$

where T is in K. The upper level, $N_2$, to achieve reasonable gain is a factor of 30 higher for glass than for yttrium aluminum garnet (YAG). So glass is less affected by temperature. However, the increase in the absorption coefficient for 1.06 $\mu$m laser photons due to thermal population of the lower laser level is higher for glass than for YAG.

The pump energy allowed within the temperature limits may now be estimated. Assuming no attempt is made to cool the rod while it is being pumped, about 15 percent of the flashlamp energy shows up as heat in the rod. It will be assumed that the YAG rods are initially at room temperature (295 K), and that a $\Delta T$ of 47 K is acceptable ($N_1/N_0 = 2 \times 10^{-4}$).

$$\Delta T = 0.15 t_p P/V\rho C \tag{5}$$

where $t_p$ is the pump pulse width in seconds, P is the pump power in watts, V is the active rod volume in $cm^3$, C is the specific heat in $Jg^{-1}K^{-1}$, and $\rho$ is the density in $g\ cm^{-3}$. For YAG, $C = 0.59\ Jg^{-1}K^{-1}$ at 300 K, $0.43\ Jg^{-1}K^{-1}$ at 200 K, and $0.13\ Jg^{-1}K^{-1}$ at 100 K.

For a system with a minimum small signal gain of about 10 in a 10-cm long YAG rod, $$\log N_2 \sigma L = \ln 10 \tag{6}$$

and $N_2 = 2.6 \times 10^{17} cm^{-3}$. Assuming that a reduction in the gain of about 10 percent due to thermal population of $N_1$ is acceptable, $N_1 = 2.6 \times 10^{16} cm^{-3}$ and $N_1/N_0 = 2.4 \times 10^{-4}$. By Equation 1, YAG can be raised to a temperature of about 347 K. While some improvement can be made by adjusting the values of system parameters, the exponential behavior makes large improvements unlikely.

For glass rods, the allowable temperature rise is considerably greater. The neodymium ion concentration for 1 percent doping is about $10^{20} cm^{-3}$. From $N_2 \sigma = \beta$, the level of $N_2$ typically is about $10^{18} cm^{-3}$, where $\sigma$ is the stimulated emission cross section and $\beta$ is the gain coefficient. Again assuming that a reduction in gain of 10 percent due to thermal population of $N_1$ is acceptable, $N_1 = 10^{17} cm^{-3}$ and $N_1/N_0 = 10^{-3}$. By Equation 4, the glass can be raised to a temperature of 420 K. If the glass system is operated at room temperature, about 295 K, the allowable temperature rise is 124 K. Assuming a typical specific heat for optical glass of 2 $Jcm^{-3} K^{-1}$, the allowable absorbed heat is 222 $Jcm^{-3}$, and the pump power is 1480 $Jcm^{-3}$.

While the forms of the invention herein disclosed constitute currently preferred embodiments, many others are possible. It is to be understood that the terms used herein are merely descriptive, rather than limiting, and that various changes may be made without departing from the spirit or scope of the invention.

We claim:

1. A laser apparatus comprising:
   a rod comprising solid lasable material,
   means for exciting atoms in the rod to a metastable state, means for maintaining low temperature gradients in the rod during periods of laser operation, until the rod reaches a temperature where thermal population in a lower laser level begins to significantly lower inversion density, and
   when the laser is turned off means for cooling the rod at a rate limited only by a thermal stress fracture level of the rod to thereby decrease beam divergence and increase laser brightness.

2. Apparatus as in claim 1, comprising control means responsive to temperature in the rod, for terminating a period of operation, by automatically discontinuing supplying pump energy, for exciting the atoms, to the rod when the rod reaches a predetermined temperature.

3. Apparatus as in claim 1, comprising control means responsive to output energy of the laser, for terminating a period of operation, by automatically discontinuing supplying pump energy, for exciting the atoms, to the rod when the output energy declines to a predetermined value.

4. Apparatus as in claim 1, comprising control means responsive to time, for terminating a period of operation, by automatically discontinuing supplying pump energy, for exciting the atoms, to the rod when the laser has been in operation for a predetermined length of time.

5. Apparatus as in claim 1, wherein the cooling means cools the rod at a rate low enough to avoid thermal stress fracture therein.

6. Apparatus as in claim 5, wherein the cooling means comprises fluid at a selected temperature substantially surrounding the rod and means for flowing the fluid along the rod at a predetermined rate.

7. Apparatus as in claim 1, wherein the rod comprises strengthened phosphate glass.

8. Apparatus as in claim 7, wherein the rod comprises ion exchange process strengthened glass.

9. Apparatus as in claim 7, wherein the cooling means cools the rod at a rate not greater than about 20 watts per centimeter of length of the rod.

10. Apparatus as in claim 1, comprising means for substantially balancing cylindrical lensing action of the rod against radial attenuation through the rod, to provide substantially uniform density of stored energy in the rod.

11. Apparatus as in claim 10, wherein the atom exciting means comprises helical flashlamps around the rod, and the balancing means comprises cylindrical wall focusing means around the flashlamps, for focusing pump photons in the rod.

12. Apparatus as in claim 10, wherein the atom exciting means comprises linear flashlamps parallel to, and evenly spaced around, the rod, and the balancing means comprises ellipsoidal wall focusing means parallel to the axis of, and partly around, each flashlamp, for focusing pump photons in the rod.

13. Apparatus as in claim 10, wherein the rod comprises neodymium doped glass, where the product of the concentration of the neodymium, C, in percent by weight, multiplied by the radius, R, of the rod in centimeters, is about 2 to 4.

14. Apparatus as in claim 1, comprising means for controlling the atom exciting means to provide quasi continuous wave operation.

15. Apparatus as in claim 14, wherein the atom exciting means comprises flashlamps and the controlling means comprises means for controlling pulse rate and pulse energy in the flashlamps.

16. Apparatus as in claim 1, comprising means for controlling the atom exciting means to provide Q-switched operation wherein pulses are extracted in groups at a frequency such that time between pulses is substantially less than fluorescent lifetime of material in the rod.

17. Apparatus as in claim 1, wherein the rod comprises neodymium:glass, and the apparatus comprises also means for controlling the atom exciting means to provide Q-switched operation wherein pulses are extracted in groups at a frequency of at least about 10 kilohertz.

18. Apparatus as in claim 1, wherein the atom exciting means comprises pumping means for providing substantially uniform spatial distribution in the excitation.

19. Apparatus as in claim 18, wherein the pumping means comprises helical flashlamp means around the rod, the helix having a substantially uniform pitch.

20. Apparatus as in claim 19, comprising means for cooling the flashlamp means during laser operation without appreciably affecting temperatures in the rod.

21. Apparatus as in claim 20, wherein the flashlamp cooling means comprises a flowing fluid.

22. Apparatus as in claim 21, wherein the flowing fluid is a gas.

23. Apparatus as in claim 18, comprising control means responsive to temperature in the rod, for terminating a period of operation, by automatically discontinuing supplying pump energy, for exciting the atoms, to the rod when the rod reaches a predetermined temperature.

24. Apparatus as in claim 18, comprising control means responsive to output energy of the laser, for terminating a period of operation, by automatically discontinuing supplying pump energy, for exciting the atoms, to the rod when the output energy declines to a predetermined value.

25. Apparatus as in claim 18, comprising control means responsive to time, for terminating a period of operation, by automatically discontinuing supplying pump energy, for exciting the atoms, to the rod when the laser has been in operation for a predetermined length of time.

26. Apparatus as in claim 18, wherein the cooling means comprises fluid at a selected temperature substantially surrounding the rod and means for flowing the fluid along the rod at a predetermined rate.

27. A method for operating a laser comprising:
  (a) exciting atoms in a rod comprising solid lasable material to a metastable state;
  (b) maintaining low temperature gradients in the rod until the rod reaches a temperature where thermal population in a lower laser level begins to significantly lower inversion density; and
  (c) when the laser is turned off cooling the rod at a rate limited only by a thermal stress fracture level of the rod to thereby decrease beam divergence and increase laser brightness.

28. The method of claim 27 further comprising terminating a period of operation by discontinuing supplying pump energy, for exciting atoms, to the rod when the rod reaches a predetermined temperature.

29. The method of claim 27 further comprising terminating a period of operation by discontinuing supplying pump energy, for exciting atoms, to the rod when the output energy declines to a predetermined value.

30. The method of claim 27 further comprising terminating a period of operation by discontinuing supplying pump energy, for exciting atoms, to the rod when the laser has been in operation for a predetermined length of time.

31. The method of claim 28, 29, or 30 further comprising substantially balancing cylindrical lensing action of the rod against radial attenuation through the rod, to provide substantially uniform density of stored energy in the rod.

32. The method of claim 28, 29, or 30 further comprising focusing pump photons in the rod to provide substantially uniform density of stored energy in the rod.

33. The method of claim 28, 29, or 30 further comprising controlling the atom excitation to provide quasi continuous wave operation.

34. The method of claim 28, 29, or 30 further comprising controlling the atom exciting means to provide Q-switched operation wherein pulses are extracted in groups at a frequency such that time between pulses is substantially less than fluorescent lifetime of material in the rod.

35. The method of claim 28, 29, or 30 wherein the rod comprises neodymium:glass, and the method comprises also controlling atom excitation to provide Q-switched operation wherein pulses are extracted in groups at a frequency of at least about 10 kilohertz.

36. The method of claim 28, 29, or 30 further comprising cooling the pumping means during laser operation without appreciably affecting temperatures in the rod.

37. The method of claim 27 comprising exciting the atoms in a substantially uniform spatial distribution.

38. The method of claim 37 further comprising terminating a period of operation by discontinuing supplying pump energy, for exciting atoms, to the rod when the rod reaches a predetermined temperature.

39. The method of claim 37 further comprising terminating a period of operation by discontinuing supplying pump energy, for exciting atoms, to the rod when the output energy declines to a predetermined value.

40. The method of claim 37 further comprising terminating a period of operation by discontinuing supplying pump energy, for exciting atoms, to the rod when the laser has been in operation for a predetermined length of time.

41. The method of claim 38, 39, or 40 further comprising substantially balancing cylindrical lensing action of the rod against radial attenuation through the rod, to provide substantially uniform density of stored energy in the rod.

42. The method of claim 38, 39, or 40 further comprising focusing pump photons in the rod to provide substantially uniform density of stored energy in the rod.

43. The method of claim 38, 39, or 40, further comprising controlling the atom excitation to provide quasi continuous wave operation.

44. The method of claim 38, 39, or 40 further comprising controlling the atom exciting means to provide Q-switched operation wherein pulses are extracted in groups at a frequency such that time between pulses is substantially less than fluorescent lifetime of material in the rod.

45. The method of claim 38, 39, or 40 wherein the rod comprises neodymium:glass, and the method further comprises also controlling atom excitation to provide Q-switched operation wherein pulses are extracted in groups at a frequency of at least about 10 kilohertz.

46. The method of claim 38, 39, or 40 further comprising cooling the pumping means during laser operation without appreciably affecting temperatures in the rod.

* * * * *